UNITED STATES PATENT OFFICE.

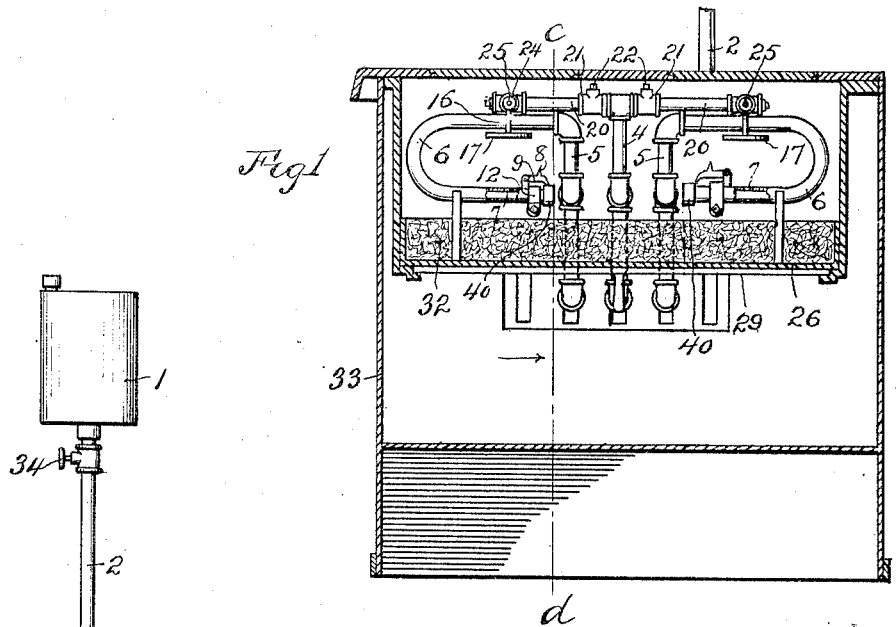

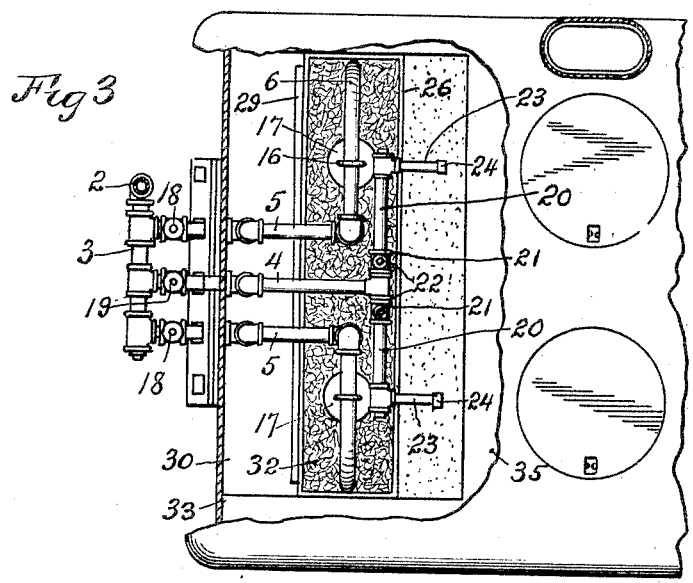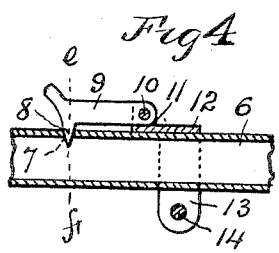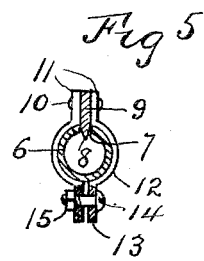

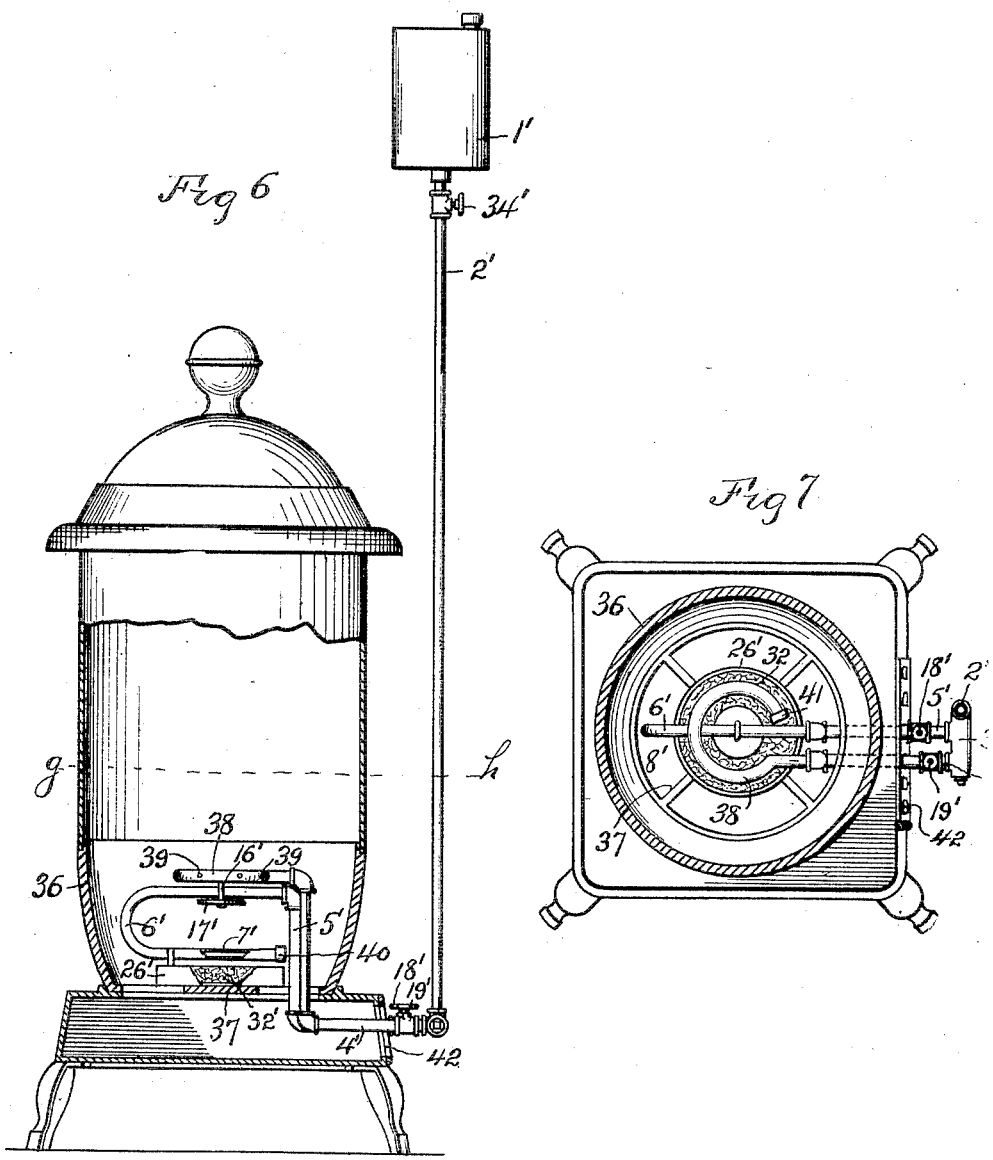

JOHN R. GREEN, OF OKLAHOMA, OKLAHOMA.

HYDROCARBON-BURNER.

1,098,568. Specification of Letters Patent. Patented June 2, 1914.

Application filed May 31, 1913. Serial No. 770,976.

*To all whom it may concern:*

Be it known that I, JOHN R. GREEN, a citizen of the United States, residing at Oklahoma, in the county of Oklahoma and State of Oklahoma, have invented a certain new and useful Improvement in Hydrocarbon-Burners, of which the following is a specification.

My invention relates to improvements in hydrocarbon burners.

One object of my invention is to provide a burner which is particularly adapted to burn kerosene oil, which is easily operated, is durable, not liable to get out of order and is efficient in its operation.

Another object of my invention is to provide a burner which may be readily adapted to be placed and used in cook stoves, heating stoves and furnaces which are already in use.

A further object of my invention is to provide a burner mechanism which, when placed in a heating stove, will heat the fire bowl thoroughly, as well as the upper portion of the stove, and which, when placed in a cook stove, will equally heat the rear lids as well as those beneath which the burner mechanism is placed.

Still another object of my invention is to provide simple and novel means by which the supply of air to the burner mechanism may be regulated.

A further object of my invention is to provide a simple and effective valve for closing, and at the same time cleaning, the small discharge opening of the vaporizer.

Other novel features of my invention are hereinafter fully described and claimed.

In the accompanying drawings which illustrate the preferred embodiment of my invention, Figure 1 is a vertical sectional view on the line $a$—$b$ of Fig. 2. Fig. 2 is a vertical sectional view on the line $c$—$d$ of Fig. 1, showing my improvement applied to a range, or cook stove. Fig. 3 is a top view of what is shown in Fig. 2, a portion of the top of the stove being broken away and the supply tank and a portion of the pipe connected therewith removed. Fig. 4 is an enlarged, vertical sectional view of a portion of one of the vaporizers shown in Fig. 1, and the needle lever mechanism connected therewith, said lever mechanism being shown in the closed position. Fig. 5 is a cross section on the line $e$—$f$ of Fig. 4. Fig. 6 is a view partly in side elevation and partly in vertical section, of a heating stove provided with a modified form of my invention, a part of one of the vaporizers being broken away. Fig. 7 is a horizontal section on the line $g$—$h$ of Fig. 6.

Referring to Figs. 1 to 5, 1 designates a tank which is connected to the upper end of a conductor 2, the lower end of which is provided with a head 3, which is disposed horizontally and which is provided with three tubular branches, the central one of which is designated by 4, and the two outer branches of which are designated by 5. To the two branches 5 are respectively connected the upper arms of two U-shaped vaporizers 6, the lower arms of which are each provided in its upper side with a vertical discharge opening 7, through which is adapted to extend a needle point 8, provided on the lower edge of a lever 9, Fig. 4, and Fig. 5, which is pivoted by a horizontal pin 10, to two ears 11, of a split ring 12, having two downwardly extending separated arms 13, through which extends a screw 14, having mounted thereon a nut 15, by means of which the ring may be clamped to the lower arm of the vaporizer 6. A ring 16, encircles each of the upper arms of the vaporizers 6, and supports a disk deflector 17, disposed horizontally directly above the discharge opening 7, in the lower arm of each vaporizer 6.

In the branches 5, are respectively mounted shut-off valves 18. A shut-off valve 19 is mounted in the branch 4. Disposed at a higher elevation than and adjacent to the upper arms of the vaporizer 6, are two vaporizers comprising two horizontal tubes 20, which are respectively connected to valve casings 21, in which are mounted valves 22. Said valve casings 21 are connected to the branch 4. Each vaporizer 20, is provided with a lateral extension 23, having mounted on its rear end a cap 24, provided with a central horizontal discharge opening, 25, shown in Fig. 1.

Below the vaporizers 6, is located a drip pan 26, which is supported upon the horizontal portion of a right angled plate 27, which forms a portion of the bottom of the fire box and is provided with two parallel, forwardly extending guides 28, in which is slidably mounted a damper 29, which is adapted to more or less close an opening 30, provided between the forward edge of the plate 27 and the front wall of the stove, which front wall is provided with an air inlet 31. The drip pan 26 may be filled with refractory material, such as mineral wool or asbestos, designated by 32.

The cook stove is designated by 33.

In the conductor 2 may be provided a shut off valve 34.

In the operation of this form of my invention, the valve 34 is first opened, as are the valves 18. The oil will then pass from the tank 1 through the conductor 2 and branches 5 into the vaporizers 6. The levers 9 having been previously turned to the open position, shown in Fig. 1, the oil will flow from the vaporizers through the openings 7 and will then fall into the drip pan 26 and upon the material 32. The oil is then ignited and in burning heats the vaporizers 6 to a degree sufficient to vaporize the oil in the vaporizers 6. The vapor on being discharged from the vaporizers 6 through the openings 7 will be ignited, and the flame will strike the deflectors 17, thus spreading the flame, which will by its heat continue the vaporizing of the oil in the vaporizers 6. The heat from the flames heats the covers directly above the fire box and also the supplemental vaporizers 20. When the latter have been sufficiently heated, the valves 22 are opened, as is the valve 19, thereby permitting oil to enter the vaporizers 20 through the branch 4 and valve casings 21. The oil in the vaporizers 20 will be vaporized and will be discharged horizontally rearwardly over the oven 35 and below the rear lids or covers of the top of the stove. In this manner the whole top of the stove and the oven will be thoroughly heated. When it is desired to clean the openings 7, in the lower arms of the vaporizers 6, the levers 9 are swung to the positions shown in Figs. 4 and 5, upon which the needle points 8 will enter the openings 7 and clean them.

Referring to the form of my invention shown in Figs. 6 and 7, 36 designates a heating stove provided with a horizontal spider plate 37, which is substituted for the ordinary grate and upon which is mounted the drip pan 26', having the absorbent material 32', mounted therein, as already described. As in the form of my invention previously described, there is provided a supply tank 1', to which is connected a vertical conductor 2' to the lower end of which is connected a horizontal header 3', to which are connected two branch pipes 4' and 5'. The branch pipe 5', as in the form of my invention already described, is connected to the upper arm of a vaporizer 6', of the kind hereinbefore described, and which is located below a vaporizer 38, having an annular ring-like portion which is provided with a plurality of lateral discharge openings 39, as shown in Fig. 6. The lower arm of the vaporizer 6' in each one of my inventions, is provided at its end with a cap 40. One end of the vaporizer 38, as shown in Fig. 7, is provided with a cap 41. The branches 4' and 5' are provided respectively with valves 19' and 18'. The conductor 2' is provided with a valve 34'.

The operation of the form of my invention shown in Figs. 6 and 7, corresponds to the operation of the form of my invention which was first described. In the first instance, the valves 34' and 18' are opened, thus permitting the oil to pass into the vaporizer 6', and through the discharge opening 7' into the drip pan 26'. After the oil in the drip pan has been ignited and has heated the vaporizer 6' sufficiently to vaporize the oil therein, the vapor passes from the vaporizer 6' through the opening 7' and is ignited. The flame heats the vaporizer 38 to a vaporizing temperature after which the valve 19' is opened, thereby permitting the oil to enter the vaporizer 38, in which the oil is vaporized and passes therefrom in horizontal jets through the openings 39. It will thus be seen that the jet flames from the openings 39 will pass horizontally and will heat the bowl and lower part of the stove, while the jet flame from the opening 7' will continue the vaporization in the vaporizers 6' and 38, and in passing upwardly will heat the upper part of the stove.

By means of my novel arrangement of the parts, the flames will be projected both laterally and upwardly, and will thoroughly heat the stove in which the device is located. The base of the stove 36 is provided with air inlet openings 42, which admit air for supporting combustion.

I do not limit my invention to the structures shown and described, as modifications, within the scope of the appended claims, may be made without departing from the spirit of my invention.

Having thus described my invention, what I claim and desire to secure by Letters Patent is:—

1. In a hydrocarbon burner, a drip pan, a support upon which the drip pan rests, and a freely movable horizontally slidable damper mounted upon said support below said drip pan and movable laterally to positions in which its outer edge will project different distances from the adjacent side of said drip pan.

2. In a hydrocarbon burner, a fire box, a drip pan located in said fire box, the fire box having an inlet for air, a support upon which the drip pan rests and which serves as a portion of the bottom of the fire box, a vaporizer disposed above the drip pan, and a damper freely and horizontally slidably mounted on said support and adapted to close, more or less, said air inlet.

3. In a hydrocarbon burner, a U-shaped vaporizer having its arms horizontally disposed, one above the other, the lower arm having a discharge opening in its upper side, a deflector carried by the upper arm above said discharge opening, a second vaporizer pipe disposed above said deflector and adapted to be heated by the burning fuel striking said deflector, said second vaporizing pipe having a discharge opening located so as to discharge laterally.

In testimony whereof I have signed my name to this specification in presence of two subscribing witnesses.

JOHN R. GREEN.

Witnesses:
JOSEPH F. CORCORAN,
E. L. GREEN.